US012722143B2

(12) United States Patent
Öhman et al.

(10) Patent No.: US 12,722,143 B2
(45) Date of Patent: Sep. 1, 2026

(54) CHROMATOGRAPHY BEADS, PRODUCTION AND USE THEREOF

(71) Applicant: Cytiva BioProcess R&D AB, Uppsala (SE)

(72) Inventors: Johan Fredrik Öhman, Uppsala (SE); Jesper Ulf Hansson, Uppsala (SE); Jasmin Faroque, Uppsala (SE); Eva Holmgren, Uppsala (SE); David Bror Lennart Jansson, Uppsala (SE)

(73) Assignee: Cytiva BioProcess R&D AB, Uppsala (SE)

( * ) Notice: Subject to any disclaimer, the term of this patent is extended or adjusted under 35 U.S.C. 154(b) by 1660 days.

(21) Appl. No.: 17/252,378

(22) PCT Filed: Jun. 25, 2019

(86) PCT No.: PCT/EP2019/066781

§ 371 (c)(1),
(2) Date: Dec. 15, 2020

(87) PCT Pub. No.: WO2020/002300

PCT Pub. Date: Jan. 2, 2020

(65) Prior Publication Data

US 2021/0187476 A1 Jun. 24, 2021

(30) Foreign Application Priority Data

Jun. 29, 2018 (GB) ..................................... 1810690

(51) Int. Cl.
*B01J 20/281* (2006.01)
*B01J 20/24* (2006.01)
(Continued)

(52) U.S. Cl.
CPC ............. *B01J 20/281* (2013.01); *B01J 20/24* (2013.01); *B01J 20/28004* (2013.01);
(Continued)

(58) Field of Classification Search
CPC .... B01J 20/281; B01J 20/24; B01J 20/28004; B01J 20/28016; B01J 20/28052;
(Continued)

(56) References Cited

U.S. PATENT DOCUMENTS 5,135,650 A * 8/1992 Hjerten .................. B01J 20/286 536/120
5,653,876 A * 8/1997 Funke ................... F04B 53/164 417/532
2010/0140467 A1* 6/2010 Goldman ........... G01N 30/7233 250/282

FOREIGN PATENT DOCUMENTS

EP 0087786 A1 9/1983
EP 1900432 A2 3/2008
(Continued)

OTHER PUBLICATIONS

Thermo Scientific (What Pressure to Expect from the Thermo Scientific Accucore HPLC Columns?).*
(Continued)

*Primary Examiner* — Anthony J Zimmer
*Assistant Examiner* — Logan Laclair
(74) *Attorney, Agent, or Firm* — Eversheds-Sutherland (US) LLP

(57) ABSTRACT

The present invention relates to chromatography beads, production and use thereof. More closely the invention relates to small, rigid and nan-permeable agarose beads suitable for example as stationary phase in high performance liquid chromatography (HPLC) for analyses of biomolecules, such as, peptides and proteins; and methods for producing such beads.

14 Claims, 3 Drawing Sheets

(51) Int. Cl.
*B01J 20/28* (2006.01)
*B01J 20/288* (2006.01)
*B01J 20/30* (2006.01)
*B01J 20/32* (2006.01)
*C08B 37/00* (2006.01)
*G01N 30/02* (2006.01)

(52) U.S. Cl.
CPC ... *B01J 20/28016* (2013.01); *B01J 20/28052* (2013.01); *B01J 20/288* (2013.01); *B01J 20/3085* (2013.01); *B01J 20/3212* (2013.01); *B01J 20/3217* (2013.01); *B01J 20/3278* (2013.01); *B01J 20/3293* (2013.01); *C08B 37/0039* (2013.01); *B01J 2220/54* (2013.01); *G01N 2030/027* (2013.01)

(58) Field of Classification Search
CPC .. B01J 20/288; B01J 20/3085; B01J 20/3212; B01J 20/3217; B01J 20/3278; B01J 20/3293; B01J 2220/54; B01J 20/291; C08B 37/0039; G01N 2030/027; C08L 5/12
See application file for complete search history.

(56) References Cited

FOREIGN PATENT DOCUMENTS

| | | | |
|---|---|---|---|
| JP | 59-051938 | A | 3/1984 |
| JP | 2008058302 | A | 3/2008 |
| JP | 2016513245 | A | 5/2016 |
| WO | 03/007814 | A1 | 1/2003 |
| WO | 2014123483 | A1 | 8/2014 |

OTHER PUBLICATIONS

Hjerten et al. (High-performance liquid chromatography of proteins on compressed, non-porous agarose beads : I. Hydrophobic-interaction chromatography, Journal of Chromatography A, 1988) (Year: 1988).*

PCT International Search Report and Written Opinion for PCT/EP2019/a066781 mailed Sep. 20, 2019 (15 pages).

Great Britain Search Report for GB Application No. 1810690.6 mailed Feb. 15, 2019 (6 pages).

Hjerten et al., "General Methods to Render Macroporous Stationary Phases Nonporous and Deformable, Exemplified with Agarose and Silica Beads and Their Use in High-Performance Ion-Exchange and Hydrophobic-Interaction Chromatography of Proteins," Chromatographia, 19091, 31(1/2)85-94.

Hjerten et al., "High-Performance Liquid Chromatography of Proteins on Compressed, Non-Porous Agarose Beads, I. Hydrophobic-Interaction Chromatography," Journal of Chromatography, 1988, 457:165-174.

Lee, "Protein Separation Using Non-Porous Sorbents," Journal of Chromatography, 1977, 699:29-45.

Liao et al., "High-Performance Liquid Chromatography of Proteins on Compressed, Non-Porous Agarose Beads, II. Anion-Exchange Chromatography," Journal of Chromatography, 1988, 457:175-182.

JP Office Action with Translation for JP Application No. 2020-572792, mailed Jun. 5, 2023, 8 pages.

Japanese First Office Action for corresponding JP Application No. 2024-103151, dated May 7, 2025, 9 pages.

Japanese Second Office Action for corresponding JP Application No. 2024-103151, dated Sep. 2, 2025, 6 pages.

* cited by examiner

CHROMATOGRAPHY BEADS, PRODUCTION AND USE THEREOF

CROSS REFERENCE TO RELATED APPLICATIONS

This application claims the priority benefit of PCT/EP2019/066781, filed on Jun. 25, 2019, which claims the benefit of Great Britain Application No. 1810690.6, filed on Jun. 29, 2018, the entire contents of which are incorporated by reference herein.

FIELD OF THE INVENTION

The present invention relates to chromatography beads, production and use thereof. More closely the invention relates to small, rigid and non-permeable agarose beads primarily suitable as for example stationary phase in high performance liquid chromatography (H PLC) for analyses of biomolecules, such as, peptides and proteins; and methods for producing such beads.

BACKGROUND OF THE INVENTION

HPLC (High Performance Liquid Chromatography) is a liquid chromatography method essential for research, manufacturing and diagnostics of chemical and biochemical compounds. Characterization and analysis of biomolecules such as peptides, proteins and their potential variants is commonly done in high pressure chromatography systems typically due to the speed and resolution obtained. Two types of columns are mainly used for routine analysis. They are either packed columns or monolithic columns. Packed columns contain particulate stationary phases most often in the shape of spherical beads that are packed tightly against each other with a column bed-height ranging from 3-30 cm. Commercially available stationary phases used in HPLC columns are typically based on silica or on synthetic organic resins such as polystyrene due to their rigidity. The use of smaller diameter beads in shorter columns is a very efficient way to achieve high performance separations at a fast rate, but also means considerably higher backpressures. Therefore, only very rigid stationary phase materials are used. The most common technique is reversed-phase chromatography.

Current available HPLC stationary phases for packed columns are based on 1.7-10 μm beaded silica or synthetic polymers, where the small diameter beads account for increased chromatographic efficiency.

The main challenges in analytical protein separations are to obtain fast separations with high resolution and low non-specific adsorption. Beads in packed columns are either porous or non-porous with separate advantages and disadvantages. Silica an synthetic non-porous particles have the advantage of short diffusion paths with binding only on the surface of the beads, which means faster mass transfer. Porous beads provide a larger surface area, which means more sites for interaction with the analytes and a higher binding capacity.

Other types of stationary phases for HPLC have been described. In U.S. Pat. No. 5,135,650, Hjertén et al. describe methods for converting porous agarose beads into beads that are substantially impermeable to proteins by either shrinking the beads or filling the pores. Shrinking by Hjertén's method is done by sequential treatment with different organic solvents, such as dioxane and chloroform, combined with cross-linking. Filling is done by adding polymerizable substances such as glycidol, that are allowed to partially bind to the internal pores and also to the bead surfaces. The final beads are described as having a porosity that is sufficiently reduced to prevent penetration by proteins of a molecular weight of 3 kDa and higher and columns packed with these beads have been shown to tolerate up to 40 bar of pressure. The main drawback with the shrinking method is the use of solvents such as dioxan which generally are avoided due to environmental, health and safety reasons.

SUMMARY OF THE INVENTION

The present invention provides small, rigid and non-permeable agarose beads suitable as stationary phase in high performance liquid chromatography (HPLC) for analyses of biomolecules, such as peptides and proteins and also for preparative use in larger scale.

The present invention provides solid agarose beads and having a rigidity to exclude compounds as small as 100 g/mol, i.e. essentially excluding even the simplest dipeptide.

In a first aspect, the invention relates to solid agarose beads, wherein the agarose beads are rigid and non-permeable for compounds having a molecular weight as low as 3000 g/mol, preferably 100 g/mol.

Preferably the beads have a diameter of 1-25 μm, preferably 1-15 μm for H PLC and 15-25 μm for preparative applications.

The solid agarose beads according to the invention resist pressures of over 100 bar, preferably 300 bar for usage in fast analytical applications at high pressure and in larger scale preparative applications at lower pressure. Small bead—high pressure Large bead-lower pressure.

Preferably the solid agarose beads are provided with tentacles/grafted polymers to increase the surface area and to enable functionalization.

The tentacles or bead surfaces may be provided with ligands, such as cation, anion, affinity (Protein A, IMAC), hydrophobic interaction ligands, or combinations thereof.

In one embodiment of the invention the solid agarose beads are 1-15 μm in diameter and packed in a HPLC column. One or more HPLC column(s) may be attached to a HPLC system. When more than one column is provided, the beads in the columns preferably have different functionality (different ligands attached).

In a second aspect the invention relates to a method for production of the solid agarose beads described above, comprising the following steps: providing agarose beads having a diameter of 5-50 μm in a solution having an agarose concentration of 8-20% (w/w); heating said solution to a constant temperature at about 45-99° C. and emulsifying said agarose beads in said solution; cross-linking of said beads at least once; activating said beads by for example allylation; and optionally grafting of polymer-tentacles on said beads to attach ligands. Alternatively the ligands may be attached to the surface of the beads. Other examples of activation are epoxy activation, NHS or CNBr activation.

Preferably ligands are provided on said polymer tentacles, such as affinity, ion exchange and hydrophobic interaction ligands.

In one embodiment, magnetic particles, such as magnetite particles, are added to the solution before the emulsification step.

In a third aspect, the invention relates to use of the solid agarose beads as above, for analyzing biomolecules, such as proteins and peptides, for example in respect of analyte concentrations, charged or hydrophobic variants and characterization. Molecules as small as 100 g/mole are excluded from the beads.

In one embodiment said beads are 1-15 μm in diameter and are used in high performance liquid chromatography (HPLC) applications.

In another embodiment said beads are 15-25 μm in diameter and are used in preparative and/or large scale applications, such as polishing.

BRIEF DESCRIPTION OF THE DRAWINGS

FIG. 2 shows comparative chromatograms of aprotinin separation.

DETAILED DESCRIPTION OF THE INVENTION

Figure 1:
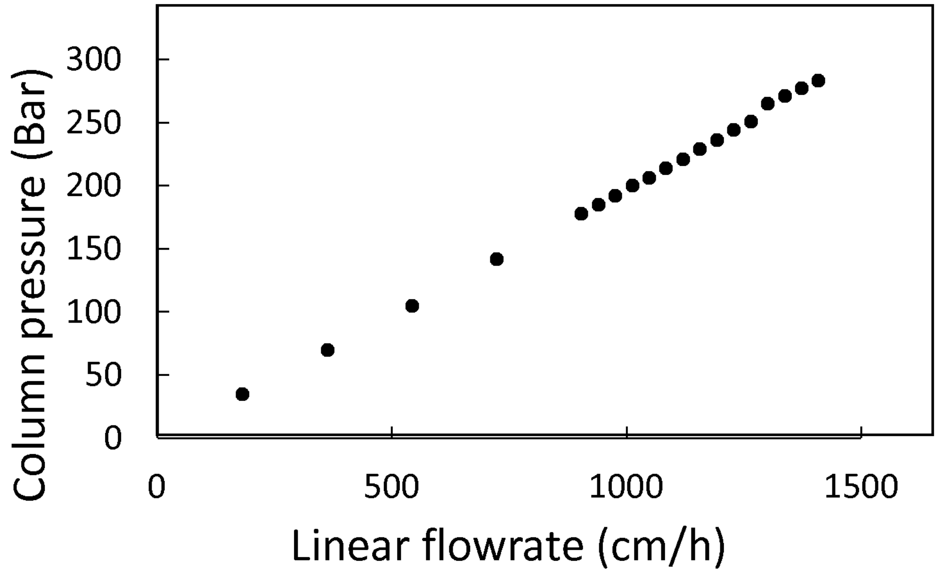
FIG. 1 shows a diagram showing the average HPLC system pressure at different flow rates over a connected 4.6 mm (i.d.)×10 cm PEEK column packed with non-porous agarose beads from Example 1.

The present inventors hypothesized that agarose beads could be made sufficiently rigid to withstand high pressures and sufficiently small to compete with currently available HPLC resins in terms of resolution and efficiency by collapsing the natural pore structure. Also, the mass transfer of analytes in columns packed with these non-porous beads will be improved leading to sharper peaks. To increase the analyte interactions with ligands immobilized to the beads, the collapsing is followed by surface grafting to enhance the available surface area. The production method is based on a first agarose emulsification step followed by a second pore collapsing step in combination with cross-linking before the beads are polymer-tentacle grafted. The beads can later be functionalized with the same type of ligands that are being used for regular, porous agarose based resins, thus for example enabling affinity, ion exchange and hydrophobic interaction chromatography. The advantage compared to silica based HPLC beads is the increased pH-tolerance, especially at alkaline pH. The agarose based beads are also naturally hydrophilic compared with the non-polar, synthetic polymer HPLC beads. This is advantageous in techniques where it is desired to minimize unwanted hydrophobic interactions between analytes and the gel resin.

The present inventors have shown that agarose beads with an average diameter of 3-6 μm can be produced and that columns packed with these beads are HPLC compatible and can be operated at pressures of at least 300 bar. Surprisingly, the beads excluded compounds as small as 100 g/mol, essentially excluding even the simplest dipeptide. This enables an efficient mass transfer and sharp narrow peaks for relevant biomolecules of all sizes. Furthermore, the signal to noise ratio will benefit from sharper peaks.

In one embodiment of the invention, the beads of the invention have been functionalized with weak cation exchange ligands and functional testing has been performed using samples with peptides and proteins ranging from 6 kDa to 160 kDa with superior resolution and speed of analysis compared to prior art.

This invention describes the methods for producing solid or non-porous agarose beads grafted with polymer-tentacles for analytical HPLC or high resolution preparative applications providing the unique combination of benefits compared to previously described stationary phases: alkaline stability, hydrophilic resin and a rapid mass transfer with an increased surface area.

Below some general and exemplary principles are described for producing solid agarose beads according to the invention:

1. Emulsification 5-50 μm diameter agarose beads with an agarose concentration of 8-20% (w/w) in water is used as the starting point for producing the small agarose beads of the invention. Any suitable emulsification method can be used, such as using an organic continuous phase, preferable toluene, with or without a membrane device with suitable pore size or by stirring. Methods for emulsifying agarose beads are described in U.S. Pat. Nos. 6,602,990 and 7,396,467.

2. Solidifying and Collapsing

A high temperature step before cross-linking is used to solidify the beaded agarose pore structure and make the beads non-porous. The pre-step collapses the agarose pore structure and makes it denser before cross-linking. The temperature is typically set to 45-99° C. during this step.

3. Crosslinking

The pre-step is followed by a cross-linking step using a cross-linker, such as epichlorohydrine in presence of sodium hydroxide. Methods for cross-linking agarose are described in U.S. Pat. Nos. 6,602,990 and 7,396,467.

4. Pore Filling

Filling of the residual pore-volume is done by several additional steps of extensive cross-linking using for example epichlorohydrine in presence of sodium hydroxide.

The residual pore-volume may also be filled by coupling of allylglycidylether (AGE) in presence of sodium hydroxide followed by deactivation and hydrolysis. Method for activation with allyl glycidyl ether and deactivation with bromine is described in EP1357988A1

5. Functionalization (Optional)

The functionalization is done by grafting of polymers through polymerisation on to an activated matrix. The activation may be done by coupling of allylglycidyl ether (AGE). A method for this step is described in EP2841177B1.

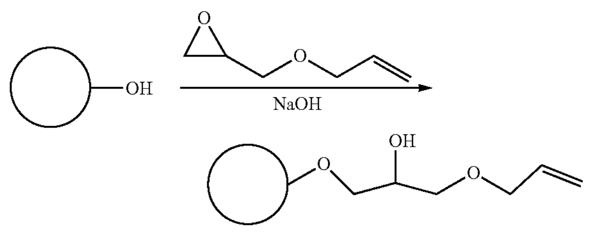

Coupling of allylglycidyl ether which can be used for either activation or filling of residual pore volume The grafting of monomers on to the activated beads is prepared by mixing one, two or several different monomers with the particle suspension in water and a radical initiator. The grafting on to the activated beads is done by free radical polymerisation. A method for grafting of monomers on to the activated beads is also described in EP2841177B1

EXPERIMENTAL PART

Example 1: Preparation of Non-Porous Agarose Beads

Emulsification

Solid beads were prepared from beaded agarose by the following procedure. 209 g agarose is suspended in 1800 ml water and heated to 95° C. to dissolve the agarose, (10% (w/w), the temperature is thereafter decreased to 70° C. The agarose solution is added to an organic phase containing toluene 2250 ml, tenside and cellulose emulsifier at 60° C. to form a coarse emulsion. This emulsion is pumped (pressed) through a hydrophobic SPG membrane repeated passages to obtain a narrow particle size distribution. The collected emulsion is cooled to 22-20° C. and washed with ethanol to remove toluene and emulsifiers. The emulsified agarose beads were finally washed with water to remove ethanol before cross-linking.

Two parallel procedures were performed to produce different emulgated agarose bead sizes, namely 5 μm and 10 μm, respectively.

Solidifying and Collapsing

Emulsified agarose gel resin was weighed and the slurry concentration was set to 75% in water (419 ml gel volume 559 ml slurry). The gel was transferred to a reactor with stirring and placed in a water bath. The gel resin was heated to 35° C. and 218 g of $Na_2SO_4$ was added to the mixture. The mixture was left for 70 min at 35° C. Then the mixture was heated to a set shrinking temperature, the evaluated temperature was 87° C. The reaction was left for 60 min at the set temperature. After the temperature was decreased to 47.5 (±1° C.). 5.6 ml of 25 M NaOH solution was added to the reaction and there after 0.5 g of $NaBH_4$ was added to the reaction.

Crosslinking

The cross-linker reagent (epichlorohydrin) and 25 M NaOH solution was added with dosing devices for 5 hours, the total amount of 25 M NaOH and epichlorohydrin that was added was 61.5 ml volume each. The reaction was left for 19±2 hours, (including the 5 hours of adding the cross-linker reagent) at 47.5° C. while stirring. The gel resin was then washed on a glass filter with distilled water (6×2 gel volumes).

The cross-linked gel resin was weighed and the slurry concentration was set to 70% in water. The gel was transferred to a round-bottom flask with stirring. 4.32 g of NaAc was added and left to dissolve for 15 min. Then bromide was added 0.345 ml to the slurry and the reaction was left for 15 min after the mixture turned yellow. After 15 minutes, the left-over bromide was destroyed with 0.7 g Na-formate, until the slurry turned white. The Na-formate was left to dissolve for 15 min and thereafter the temperature was increased to 40° C. and 48.1 g $Na_2SO_4$ was added and the reaction was left for 60 min 13.75 ml of 25 M NaOH solution was added to the mixture and the reaction was left at 40° C. for 16-20 hours while stirred. The gel resin was then washed on a glass filter with distilled water (6×2 gel volume).

Pore Filling by Repeated Crosslinking

The hydrolyzed gel resin was weighed and the slurry concentration was set to 75% gel and the rest distilled water. The gel resin was transferred to a reactor with a water bath and stirring. The gel was heated to 33° C. and 42.6 g $Na_2SO_4$ was added to the mixture. The mixture was left for 70 min at 33° C. After that, the temperature was increased to 47.5 (±1° C.) and the mixture was left for 60 min while stirring. 1.1 ml 25 M NaOH solution was added to the reaction. The cross-linker (epichlorohydrin) and NaOH was added with dosimats for 5 h, the total amount of NaOH and epichlorohydrin that was added was 12 ml volume each. The reaction was left for 19(±2 hours) at 47.5° C. while stirring. The gel was then washed on a glass filter with distilled water (6×2 gel volume).

Pore Filling by Allylation

The gel slurry was weighed and added to a glass filter and washed with 50% NaOH solution (2×1 gel volume). The gel was drained and added in to a reactor together with an equivalent amount of 25 M NaOH (e.g. 100 g drained gel add 100 ml 25 M NaOH). The stirring was started at 200 rpm. Thereafter, $NaBH_4$ was added (1 g for 100 g gel). The gel slurry was heated to 50° C., then allylglycidyl ether (AGE) was added (100 g gel add 200 ml AGE). The stirring was increased to 300 rpm. The reaction was left over night (16-20 hours) at 50° C. The next day the gel slurry was added to a glass filter and washed with distilled water (3×2 gel volumes), ethanol (5×2 gel volumes) and distilled water (5×2 gel volumes)

Results

Determination of Size

The resulting beads were analyzed by measuring the size conducted with a laser diffraction particle size analyzer. The average diameter of the shrunken agarose beads was about 3 and 5 μm after this procedure, when starting from initial 5 and 10 μm emulsified agarose beads respectively.

Determination of Porosity

A 4.6 mm (i.d.)×10 cm PEEK column was packed with 5 μm non-porous beads from Example 1 under a constant pressure of 100 bars for 15 minutes. To determine the $K_{AV}$-values it is necessary to know the void, which is measured by retention volume of compounds with a large molecular weight, such as Blue Dextran 2000. The determination of the porosity was made by measuring the elution volume of injected compounds, Blue Dextran 2000, ($2\times10^6$ g/mol), potassium nitrate (101.1 g/mol) and acetone (58.1 g/mol). The retention volume of Blue Dextran 2000 was 0.78 ml and the resulting $K_{AV}$-values for potassium nitrate, (Ve 0.78 ml) and acetone, (0.79 ml) were 0 and 0.01 respectively using the geometric volume 1.66 ml as Vt. Generally, the inner volume of the column is measured by subtracting the void volume from the elution volume of small molecules, which in this case results in 0-0.01 ml, i.e. a non-porous chromatography stationary phase for all but very small compounds.

Example 2: Preparation of Non Porous Agarose Beads with Cation Exchange Ligands This example illustrates the preparation of a cation exchanger by derivatization of non-porous agarose beads of Example 1 starting with 5 μm non-porous agarose beads.

Drained gel resin was poured into a three headed round flask. An ionic monomer VSA, a neutral monomer VP and water was added, see scheme below. The pH was adjusted with acetic acid and NaOH to a pH between 7-8. Then the initiator 2,2'-Azobis(2-methyl-propionamidine) dihydrochloride (ADBA) was added and a tube with a continuous flow of nitrogen gas was lowered into the dispersion. The flask was then lowered into a water or glycerol bath and the reaction was left at 48-50° C. for 16-20 hours while stirred. The gel resin was then washed on a glass filter with distilled water (6×2 gel volume). The gel resin was titrated to measure the ion capacity after the reaction.

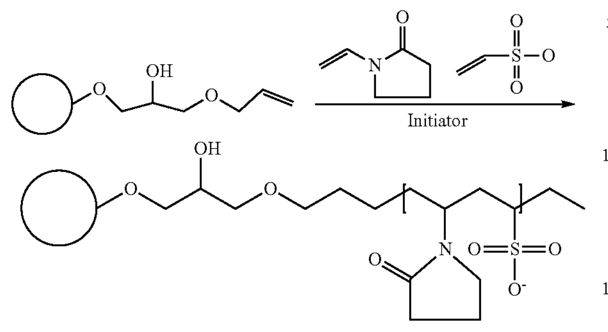

Polymerisation of monomers on to activated beads using Vinylpyrrolidone (VP) and vinylsulfonate (VSA)

Example 3: Pressure Vs Flow Rate Performance of Non-Porous Agarose Beads

This example demonstrates the pressure-flow rate performance of the non-porous agarose beads of the invention.

A 4.6 mm (i.d.)×10 cm PEEK column was packed with 5 μm average diameter non-porous beads from Example 1 under a constant pressure of 100 bars for 15 minutes. Then the PEEK column was connected to a high-pressure HPLC system (Agilent 1260 Infinity II) using PEEK fingertight connectors. Water was pumped over the column starting from a flow rate of 0.5 ml/min, (181 cm/h linear flowrate) and was incrementally increased up to 3.9 ml/min (1408 cm/h). The average system pressure was noted at the different flow rates. FIG. 1 shows that the relationship between flow rate and the system pressure was linear in the entire range, indicating that the can column be operated up to at least a flow rate of 4 ml/min.

Example 4: Chromatographic Separation (Comparative Examples)

4A

This example compares the peak efficiency of Aprotinin, (6.5 kDa), separated on a gradient from low to high salt on a Mini S column (GE Healthcare) and a PEEK column packed with non-porous beads from Example 2. Also, a comparison of chromatograms from the separation of a monoclonal antibody, (160 kDa), on an increasing pH-gradient from pH 6-9 is shown between a Mono S column and the example PEEK column.

Figure 2A:
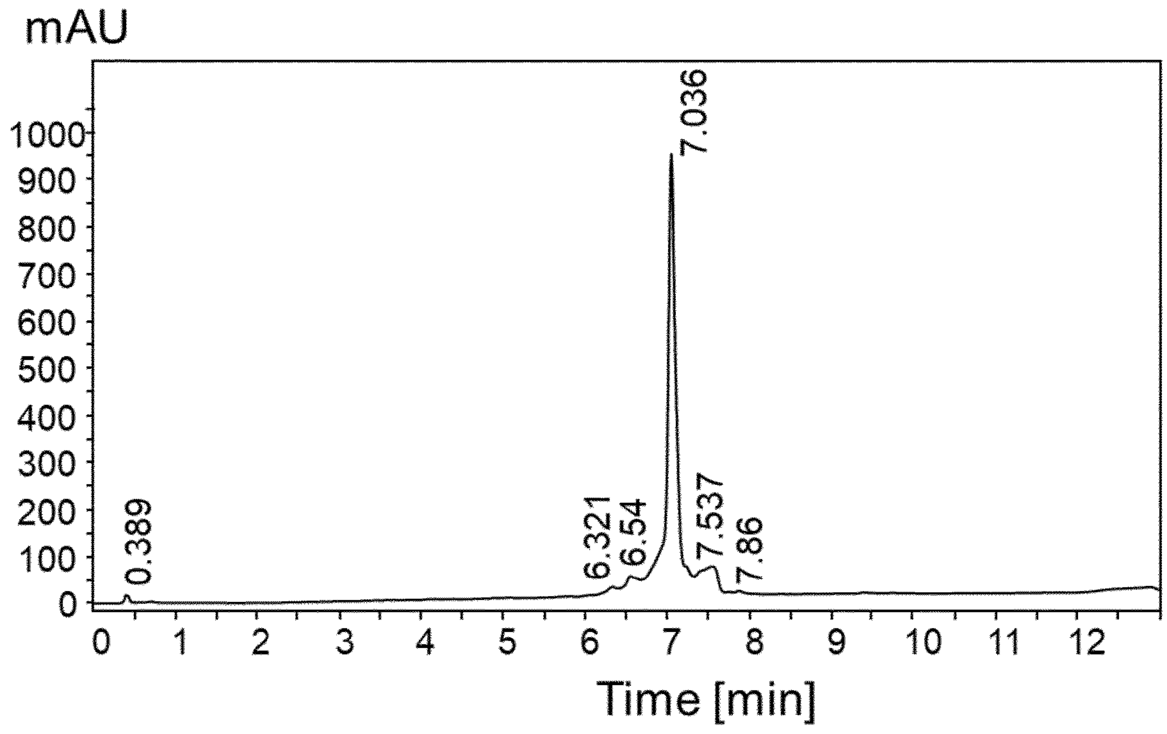
FIG. 2A shows separation of aprotinin on non-porous agarose beads from Example 2 packed in 4.6 mm (i.d.)×10 cm PEEK column, in a 10 min. linear gradient from 0-500 mM sodium chloride at 1.66 ml/min.
Figure 2B:
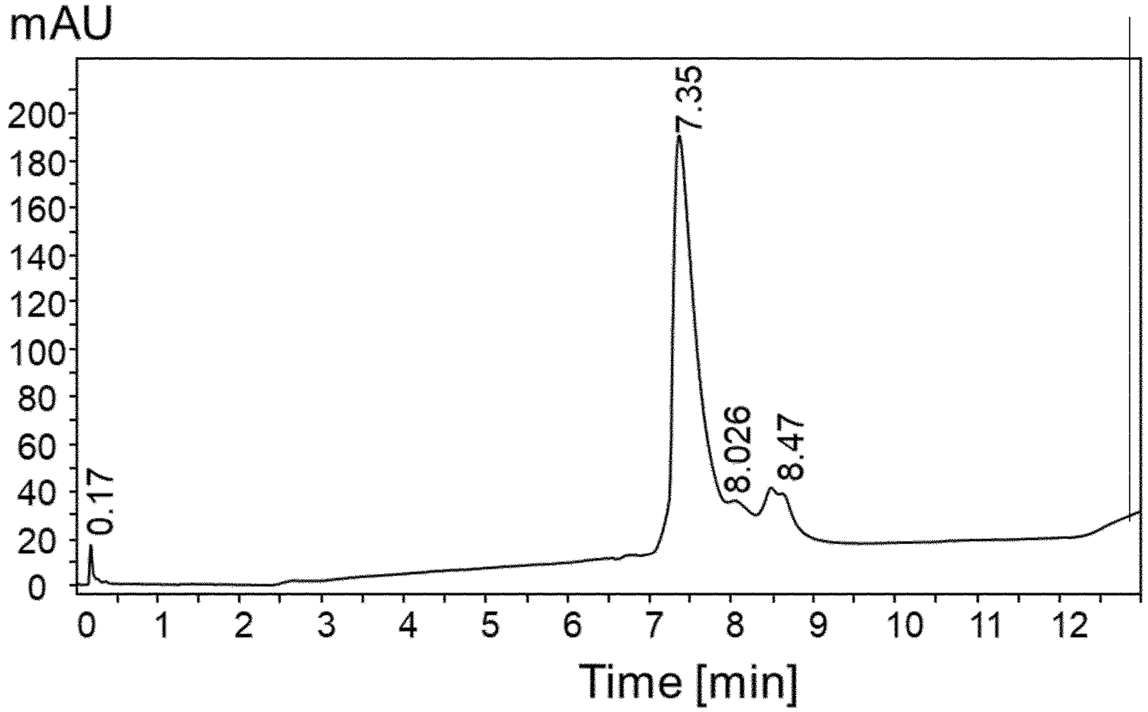
FIG. 2B shows separation of aprotinin on a prior art Mini S column, 3.2 mm (i.d.)×3 cm, in a 10 min. linear gradient from 0-500 mM sodium chloride at 0.80 ml/min. mAU-units at 214 nm.

A packed column containing beads of Example 2, with an average diameter of 5 μm and an ionic capacity of 37 μmol/ml was prepared as in Example 3. The column was equilibrated with 20 mM sodium-phosphate (pH 6.5). Aprotinin, (1 mg) was dissolved in 1 ml of equilibration buffer and 20 μl, equal to 20 μg, was injected onto the column. Bound aprotinin was eluted in a linear gradient from 0-500 mM NaCl in 10 minutes at a linear flow rate of 600 cm/h. A Mini S column, 3.2 mm (i.d.)×3 cm was run in comparison with the same method and linear flow rate but with 5 μg aprotinin injected. The peak efficiency expressed as width at half peak height was 5.5 sec. for the column packed with non-porous agarose beads compared with 17.5 sec. for the Mini S column, (FIGS. 2 A and B respectively).

4B

Figure 3A:
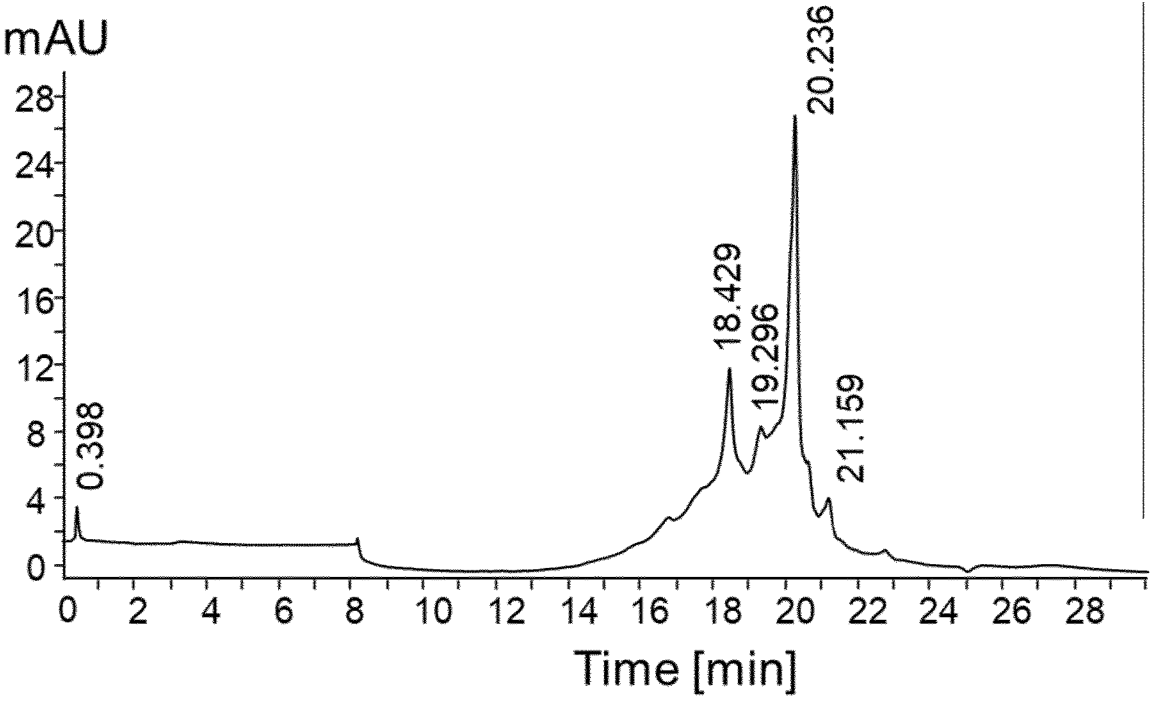
FIG. 3 shows comparative chromatograms of the peak resolution of mAb separation on FIG. 3A: non-porous agarose beads from Example 2 in PEEK column
FIG. 3B: prior art Mono S column. Separation of monoclonal antibody charged variants was done on ion exchange columns using ascending pH-gradients. 46 μg of monoclonal antibody was loaded on each column. mAU-units at 280 nm.
Figure 3B:
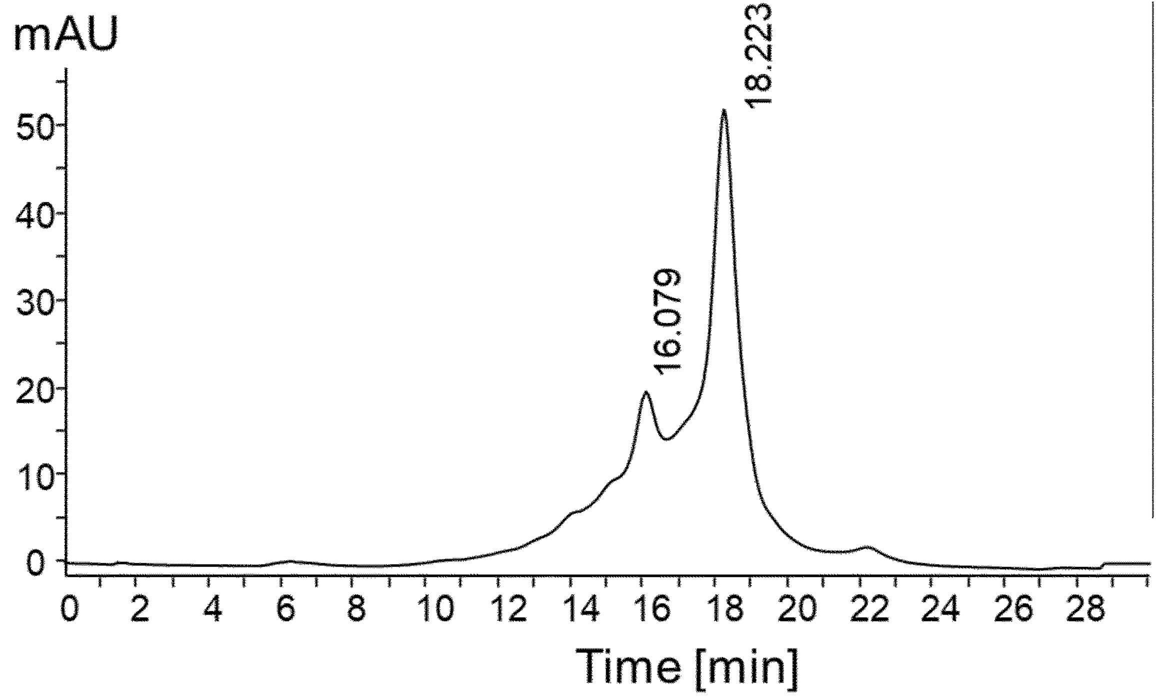

The PEEK column packed with non-porous agarose beads from Example 2 was equilibrated with 10 mM sodium-citrate, 10 mM sodium-phosphate, 10 mM Tris, (pH 5.3). A monoclonal antibody (recombinantly produced in CHO-cells and purified on a Protein A affinity column), was diluted from 28 g/L to 2 g/L in 10 mM sodium phosphate (pH 6.5) and 23 μl, equal to 46 μg antibody, was injected onto the column. The bound antibody was eluted on a linear gradient from equilibration buffer at pH 5.3 to the elution buffer at pH 8.7 during 10 minutes at 600 cm/h. A Mono S column, 5 mm (i.d.)×5 cm was run in comparison with the same method but at a reduced linear flow rate and increased gradient time, 300 cm/h for 20 minutes. The resolution comparison between the main peak, (highest peak), and the acidic and alkaline variants in front and after the main peak respectively can be seen in FIG. 3. The PEEK column packed with non-porous beads show increased performance at twice the speed.

The invention claimed is:

1. Solid agarose beads, wherein the agarose beads are rigid and non-permeable for compounds having a molecular weight of 100 g/mol, wherein the beads resist pressures of ≥100 bar.

2. The solid agarose beads according to claim 1, wherein the beads have a diameter of 1-25 μm.

3. The solid agarose beads according to claim 1, wherein the beads are provided with tentacles/grafted polymers on the surface.

4. The solid agarose beads according to claim 3, wherein the tentacles/grafted polymers or bead surfaces are provided with ligands, selected from cation, anion, affinity, Protein A, Protein G, metal-ion chelator, hydrophobic interaction ligands, or combinations thereof.

5. The solid agarose beads according to claim 1, wherein the beads are 1-15 μm in diameter and configured to be packed in a HPLC column.

6. The method for production of the solid agarose beads according to claim 1, comprising the following steps: providing agarose beads having a diameter of 5-50 μm in a solution having an agarose concentration of 8-20% (w/w); heating said solution and emulsifying said agarose beads in said solution; cross-linking of said beads at least once after emulsification; activation by allylating said beads to shrink and fill in remaining pores in said agarose beads; and adding ligands to said beads.

7. The method according to claim 6, wherein the ligands are provided on polymer tentacles grafted on the beads, selected from affinity, ion exchange and hydrophobic interaction ligands.

8. The method according to claim 6, wherein magnetic particles are added to the solution before the emulsification.

9. A method of use of the agarose beads according to claim 1, comprising analyzing biomolecules, proteins or peptides using said beads.

10. The use according to claim 9, wherein molecules as small as 100 g/mole are excluded from the beads.

11. The use according to claim 9, wherein said beads are 1-15 μm in diameter and are utilized in high performance liquid chromatography (HPLC).

12. The use according to claim 9, wherein said beads are 15-25 μm in diameter.

13. The solid agarose beads according to claim 1, wherein the solid agarose beads are cross-linked.

14. The solid agarose beads according to claim 1, wherein one or more pores of the solid agarose beads are collapsed and filled.

* * * * *